June 20, 1961 C. J. TRIBLE 2,988,943
CUTTING TOOL BLOCK
Filed May 14, 1958 2 Sheets-Sheet 2
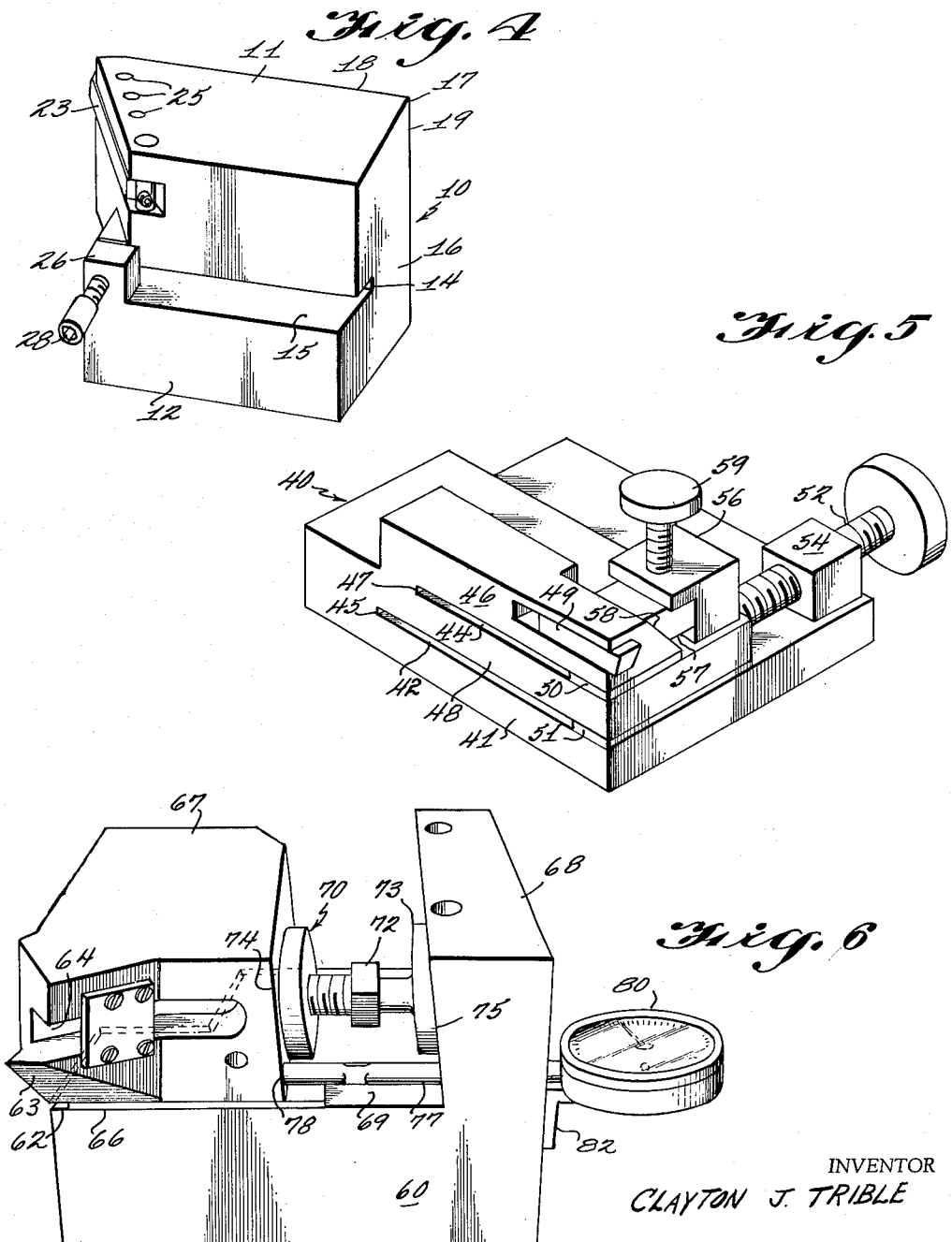
INVENTOR
CLAYTON J. TRIBLE
BY
ATTORNEY 2,988,943
CUTTING TOOL BLOCK
Clayton J. Trible, Parma, Ohio, assignor to General Motors Corporation, Detroit, Mich., a corporation of Delaware
Filed May 14, 1958, Ser. No. 735,212
12 Claims. (Cl. 82—36)

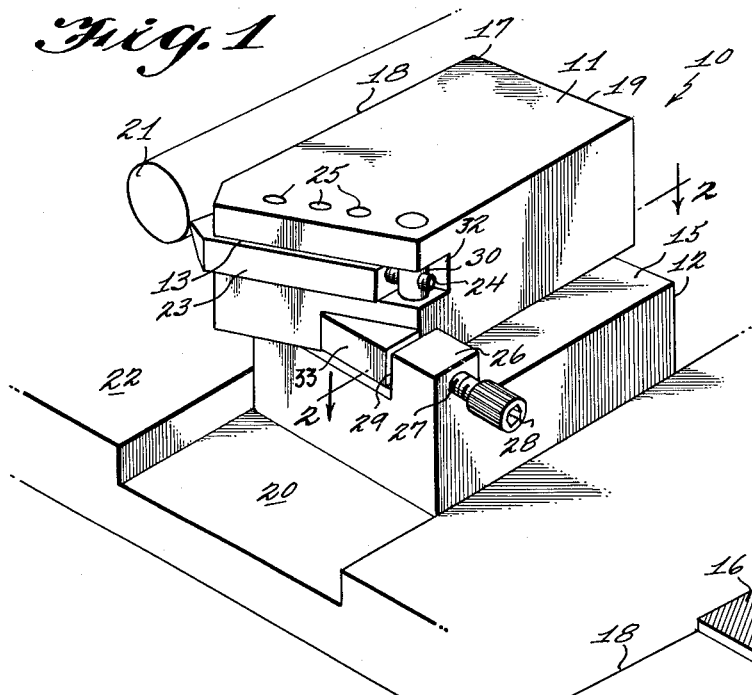
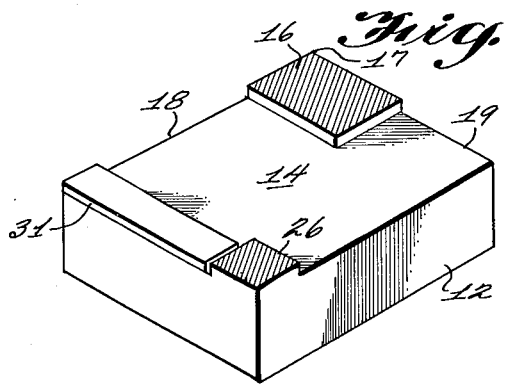
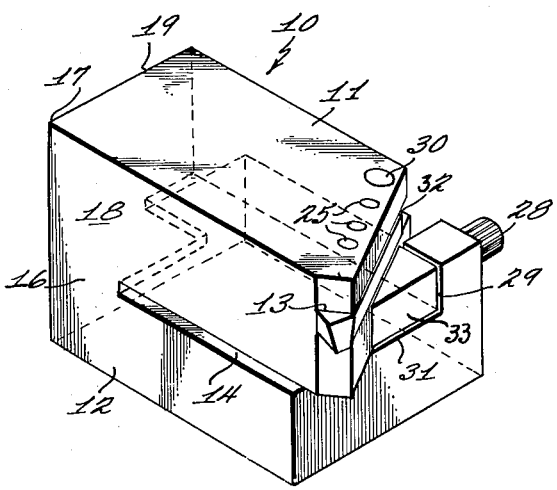

This invention relates to tool holders and more particularly to adjustable tool holders having means to position a tool relative to a workpiece.

One of the main advantages of the present tool holder is that after adjustments are made there are no additional clamping screws that are required to be tightened nor slides to be locked which tightening or locking in previous practice, employing conventional tool holders, contributed inaccuracies to the tool position after it was thought to be in the desired location. Some tool holders have previously been provided with adjusting means that move a tool holding section relative to a second section by varying the width of a slot. These adjusting mechanisms require locking devices to maintain the tool in the adjusted position and lack sufficient rigidity to maintain the adjustments during operation.

In the present invention adjustments can be made faster and with less skill than is required with conventional tool holder blocks. The block is cheaper to construct than blocks containing slides or pivots and the time required to continually keep cutting tools in adjustment is greatly reduced by the utilization of this invention. The improved construction includes a tool holder which is partially divided into two sections by a slot. The two sections are integrally connected at a single area of contact and adjusting means are provided to deflect one section relative to the other about the integral connection and in the plane of the slot.

An object of this invention is to provide a new and useful tool holder having an adjusting mechanism that greatly reduces the expensive machine set-up man hours previously needed to keep cutting tools in adjustment.

Another object is to provide a simple mechanism for adjusting a tool block comprising a plurality of sections by stressed deflection of at least one section relative to another section.

A further object of this invention is to utilize a one-piece tool block having a simple adjusting mechanism for the tool holding section; more specifically, an object of this invention is to provide a novel one-piece tool block having the cutting tool carried in a section of the tool block which may be adjustably positioned relative to a second portion of the tool block by a single adjusting mechanism.

Other objects and advantages of the invention will be apparent from the following description. An embodiment of means of carrying out the principles of the invention are illustrated in the accompanying drawings in which:

FIGURE 1 is a perspective view of the preferred embodiment of the invention;

FIGURE 2 is a sectional view taken along line 2—2 in FIGURE 1;

FIGURE 3 and FIGURE 4 are additional perspective views of the embodiment shown in FIGURE 1;

FIGURE 5 is a view of another embodiment of the invention showing a multiple section tool holder in perspective; and FIGURE 6 is a perspective view of a tool holder illustrating an alternative adjusting mechanism in accordance with the present invention.

The following is a detailed description of the invention:
As shown in FIGURES 1, 3 and 4 a tool holder block 10 comprises a top section 11 and a bottom section 12. As shown in FIGURE 1 the bottom section is secured in a groove 20 in a machine work surface 22. The two sections 11, 12 are partially separated by a slot 14 and are rigidly connected at a single area of contact 16 located at the corner 17 defined by the vertical sides 18, 19 of the block 10. The single area of contact 16 is best illustrated in FIGURE 2 from which it is clear that the area 16 rigidly connects the two sections and provides a point or area about which the upper section 11 may be deflected relative to the bottom section 12 in the plane of the slot 14. Thus, it will be seen that the deflection is about the axis of the integral connection and in the general plane of the dividing slot.

The upper section 11 of the block 10 is provided with a tool retaining groove or seat 13 in which is seated a cutting tool 23. The cutting edge of the tool 23 extends at an angle from the side 18 which also defines the corner 17 but may be positioned at other points. A workpiece 21 (FIGURE 1) is located adjacent the cutting tool 23. The cutting tool is secured in the groove by means of set screws 25 and is provided at one end with adjusting means comprising a threaded rotatable bolt 24 mounted in a post 30 within the groove or seat 32.

The width of section 11 is less than that of the base section 12 so that a portion 15 of the base section 12 extends beyond the tool supporting upper section 11.

A post 26 is integrally attached to the extension 15 and is provided with a threaded aperture 27. The post 26 extends upwardly from the extension 15 and defines a vertical slot 29 in conjunction with the upper section 11. FIGURE 3 particularly illustrates the vertical slot 29 which divides the upper section 11 and the integral post 26 attached to the extension 15.

An adjusting member, screw 28, is cooperatively engaged in the threaded aperture 27. One end of the adjusting member 28 abuts the upper section 11 through the slot 29. The threaded adjusting member 28 may be of the micrometer type to allow for regulated adjustment of the cutting tool relative to the workpiece. In this embodiment a projection 33 extending from the tool supporting section 11 provides the abutment for the member 28. The post 26 and the adjusting means 28 are located diagonally opposite the corner 17. FIGURE 4 gives the most complete view of the extension 15, the corner 17 and the relation of the adjusting mechanism 28 to the upper section 11. It is obvious that the relative positions of the cutting tool 23 and the adjusting means may be varied to obtain the same result within the scope of this invention.

A hardened strip of gauge stock 31 is seated in the slot 14 in a tight fit to give rigid support to the front edge of the upper section 11 and resist downward force resulting from cutting action of the tool 23. The insert 31 may be of any shape and positioned in any manner to provide support for the upper section 11. It is possible that the support 31 could be made integral with either the top section 11 or the bottom section 12. It will be seen that the adjustment member 28 will transmit force through its abutting end to the upper section 11. The base section 12 being rigidly secured, the upper section 11 will be deflected about the single connecting area 16 in a plane parallel to the separating slot 14. This adjustment is simple, efficient, rigid and requires less skill for accurate positioning than previous tool holders.

The tool holder 10 may be fastened to the work surface in any conventional manner. For instance, the tool block could be rigidly secured and the workpiece rotated against the cutting tool or the tool block could be so mounted as to be movable longitudinally of the workpiece. After the tool holder is secured to the work surface, the cutting tool may be adjusted by means of the threaded bolt to any desired depth of cut. A manual adjustment, which will be accurate and rigidly maintained at the selected position, may be made at any time during the cutting operation by means such as a micrometer type adjusting screw that will facilitate accuracy.

FIGURE 5 illustrates an embodiment of the invention which utilizes a plurality of deflecting sections. It is desirable in some instances to provide means for adjusting the position of the cutting tool in two stages. After the tool holder is secured to the work surface it may be desirable to make a rough preliminary cut by adjustment of a micrometer means having coarse threads and then make additional adjustments by a second micrometer means having fine threads.

In FIGURE 5 the tool holder 40 is divided into three sections by slots 42 and 44. The top section 46 supports a cutting tool 49 which may be attached in any conventional manner. The middle section 48 is rigidly attached to both the base section 41 and the top section 46 at single areas of contact such as 45 and 47. Shims 50 and 51 are seated in the slots 42 and 44 to provide support during the cutting operation. A threaded bolt 52 cooperates with an aperture in the post 54 carried by the base section 41 for coarse adjustment of the middle section 48 and the upper section 46. The middle section 48 supports a post 56 and a cam 57 is slidably seated between the post and the adjacent surface 58 of the upper section 46. A threaded bolt 59 is carried by the post 56 and abuts the top surface of the cam 57 to provide for fine adjustment of the upper section 46 relative to the middle section 48.

Thus, a coarse adjustment may be made by rotation of the threaded bolt 52 causing deflection of the top section 46 and the center section 48 relative to the base section 41. Rotation of the adjusting screw 59 carried by the post 56 causes deflection of the top section 46 relative to both the base section 41 and the center section 48 in its initial adjusted position. The adjusting screw 59 may thus be utilized to provide a fine micrometer adjustment after a coarse adjustment by the adjusting screw 52.

FIGURE 6 illustrates another embodiment of the invention having a modified adjustment mechanism. The tool block 60 is partially separated into two sections by the slot 62. The upper section 63 is provided with a tool carrying portion 64 similar to that shown in the preferred embodiment. A support shim 66 is seated in the slot 62. The upper section 63 is rigidly connected to the block 60 at a single area of contact below that portion of the block indicated at the corner 67.

The block 60 is provided with a space 69 between the upper section 63 and the rear section 68 of block 60. Seated against the beveled side wall 74 of the top section 63 and the beveled wall 75 of the rear section 68 is a pair of cylindrical adjusting discs 70 and 73. The beveled walls are inclined at an angle which will cause cutting forces passing through the tool to the block to be rigidly counteracted. Member 72 is threadably engaged with disc 70 so that rotation of the threaded member will vary the pressure between the discs and cause the upper section 63 to deflect about the rigid connection at the corner 67. A gauge 80 is connected by means of a probe 77 to the upper section 63 at 78 so that deflections will be registered and adjustment can be regulated. The probe 77 passes through the rear section 68 and the gauge 80 is supported by the bracket 82 attached to the block.

When the threaded member 72 is rotated as by means of a wrench, the cutting tool will be adjusted in relation to the workpiece by deflection of the upper section of the tool holder relative to the base section about an axis generally perpendicular to and intersecting the plane of the separating slot.

It will be seen that the rigid connection between the sections of the tool holder may be located at a point other than the corner of the tool block, as in the center of one end of the sections, and the connection might be made by a torsion rod or pin rigidly secured between a plurality of sections. A torsion rod connection would be less desirable because of the added cost of assembly and problems involved in making a suitable rigid connection.

In operation of each embodiment the tool holder permits adjustment of the cutting tool in relation to the workpiece by deflection of the tool carrying portion of the tool block relative to the base section about an axis passing through the area of the rigid connection and intersecting the plane of the dividing slot. The simple means of applying pressure through a screw adjustment movement moves the cutting tool to the desired position and rigidly holds it in place during the cutting operation without resort to additional locking mechanism to give the holder necessary operational stability.

It is to be understood that minor changes in position of the cutting tool, the rigid connection and the adjusting means may be made without departing from the scope and spirit of this invention as claimed.

In accordance with the above detailed description of the invention, I claim:

1. In a tool support, a plurality of sections rigidly connected to one another, said sections being partially separated by at least one slot, said slot forming a joining portion at right angles to the faces of said slot and effectively acting as a pivot post about which said sections can relatively pivot in a plane substantially parallel to said faces by a twisting action creating torsional stress on said post, and means to adjustably deflect one of said sections about an axis passing through the joining portion between adjacent sections and intersecting the plane of said slot to adjustably position a tool supported thereby.

2. A tool holder separated into a plurality of sections by slots, rigid connections between adjacent sections, each rigid connection providing a joining portion between adjacent sections at right angles to the faces of the separating slot therebetween and effectively acting as a pivot post about which said sections can relatively pivot in a plane parallel to said faces by a twisting action on said post, means for securing a tool to one of said sections, and adjusting means for causing regulated movement of said sections relative to one another in a plane generally parallel to said slots.

3. A tool holding block comprising a plurality of sections and having adjacent sections separated by a slot, each of said sections having a rigid connection therebetween providing a joining portion at right angles to the faces of said slot and effectively acting as a pivot post about which said sections can relatively pivot in a plane parallel to said faces by a twisting action on said post, tool securing means on one of said sections, and adjusting means for causing regulated movement of said one of said sections relative to the other sections about an axis passing through said rigid connection and intersecting the plane of said slot.

4. A tool holder comprising a body member partially separated into two sections by a slot, a rigid connection extending between said sections and forming a joining portion at right angles to the faces of said slot and effectively acting as a pivot post about which said sections can relatively pivot in a plane parallel to said faces by a twisting action on said post, support means seated in said slot to maintain said faces substantially parallel during movement of one section relative to the other, means for supporting a tool on one of said sections, a threaded micrometer adjusting member supported by the other of said sections, one end of said micrometer adjusting member cooperating with said one of said sections and arranged so that rotation of said micrometer adjusting member causes movement of said one of said sections in a plane generally parallel to said slot about an axis passing through said rigid connection and intersecting the plane of said slot.

5. The combination of a tool holder comprising a block partially separated into sections by a slot, a rigid connection formed between said sections of said block by said slot and providing a joining portion at right angles to the faces of said slot and effectively acting as a pivot post about which said sections can relatively pivot in a plane parallel to said faces of said slot by a twisting action on said post, tool supporting means provided on one of said sections, and adjusting means supported by the other of said sections and being engageable with said one of said sections to apply a torsional force causing movement of said one of said sections relative to said other of said sections in a plane generally parallel to said slot and about a pivotal axis passing through said rigid connection and intersecting the plane of said slot.

6. A tool holder separated into a base section and a plurality of deflecting sections by slots, a rigid connection between adjacent sections providing a joining portion at right angles to the faces of the separating slot therebetween and effectively acting as a pivot post about which said sections can relatively pivot in a plane parallel to said faces by a twisting action on said post, means for securing a tool in one of said deflecting sections, a first adjusting means operatively associated with said holder for causing movement of said deflecting sections relative to said base section, and a second adjusting means operatively associated with one of said deflecting sections for causing regulated movement of said one of said deflecting sections relative to the other of said deflecting sections.

7. A tool block comprising a base portion, a depending portion extending from said base portion, a tool holding portion extending substantially parallelly to said depending portion from said base portion, said tool holding portion being rigidly connected to said base portion by a joining portion, a slot partially separating said tool holding portion from said base portion and defining said joining portion, said joining portion extending at right angles to the faces of said slot and effectively acting as a pivot post about which said tool holding portion can pivot relative to said base portion in a plane parallel to said faces by a twisting action on said joining portion, said depending portion and said tool holding portion being separated by a recess intersecting said slot, adjustment means abutting said depending portion and said tool supporting portion and extending therebetween within said recess, and said adjustment means being actuable to variably position said tool holding portion relative to said base portion by the application of force in a plane substantially parallel to said slot to effect substantially torsional rotative movement of said tool holding portion about said rigid connection.

8. A tool block comprising a base portion, a depending portion extending from said base portion, a tool holding portion extending substantially parallelly to said depending portion from said base portion, said tool holding portion being rigidly connected to said base portion by a joining portion, a slot partially separating said tool holding portion from said base portion and defining said joining portion, said joining portion extending at right angles to the faces of said slot and effectively acting as a pivot post about which said tool holding portion can pivot relative to said base portion in a plane parallel to said faces by a twisting action on said joining portion resulting in torsional stressing thereof, said depending portion and said tool holding portion being separated by a recess intersecting said slot, adjustment means abutting said depending portion and said tool supporting portion and extending therebetween within said recess, said adjustment means being actuable to variably position said tool holding portion relative to said base portion by the application of force in a plane substantially parallel to said slot to effect substantially rotative movement of said tool holding portion about said rigid connection, and means positioned within said slot between said base portion and said tool holding portion to maintain said faces of said slot in substantially parallel alignment and equally spaced from one another during adjusting movement of said tool holding portion.

9. A tool holder comprising a base section, a tool supporting section, a rigid connection between said base section and said tool supporting section, a slot partially separating said base section and said tool supporting section, the plane of said slot being substantially transverse to the central axis of said rigid connection, tool holding means provided on said tool supporting section to secure a tool substantially parallel to said slot, clamping means to prevent movement of said base section, adjusting means to variably position said tool supporting section relative to said base section, said rigid connection effectively acting as a pivot post about which said tool supporting section is adjustably movable by a twisting movement in a plane parallel to said slot, and means to maintain the opposite faces defined by said slot in parallel alignment and equally spaced from one another during adjusting movement of said tool supporting section relative to said base section.

10. A tool holder comprising a base section, an intermediate support section, a first rigid connection extending between said base section and said intermediate support section, a slot partially separating said base section and said intermediate section, a tool holding section, a second rigid connection extending between said intermediate support section and said tool holding section, a slot partially separating said tool holding section and said intermediate support section, each of said rigid connections extending at right angles to the faces of the slot associated therewith and effectively acting as a pivot post, said tool holding section and said intermediate support section being movable relative to said base section about said first rigid connection and said tool holding section being movable relative to said intermediate section and said base section about said second rigid connection in planes parallel to said faces by a twisting action on said rigid connections causing torsional stress, coarse adjusting means being associated with said intermediate support section and being actuable to variably position said intermediate section and said tool holding section relative to said base section by the application of force in a plane substantially parallel to the slot between said intermediate support section and said base section to effect substantially rotative movement of said tool holding section and said intermediate support section about said first rigid connection, and relatively fine adjustment means being associated with said tool holding section and actuable to variably position said tool holding section relative to said intermediate support section and said base section by the application of force in a plane substantially parallel to the slot between said intermediate support section and said tool holding section to effect substantially rotative movement of said tool holding section about said second rigid connection.

11. A tool holder comprising a base section, a tool supporting section, a rigid connection extending between said base section and said tool supporting section, a slot separating said base section and said tool holding section, said rigid connection extending at right angles to the faces of said slot and effectively acting as a pivot post about which said tool supporting section can pivot relative to said base section in a plane parallel to said faces by a twisting action on said rigid connection, and adjustment means being actuable to variably position said tool holding section relative to said base section by the application of force in a plane substantially parallel to said slot to effect substantially rotative movement of said tool holding section about said rigid connection.

12. The apparatus as defined in claim 11 and comprising means positioned within said slot between said base section and said tool holding section to maintain said faces of said slot in parallel alignment and equally spaced from one another during adjusting movement of said tool holding section.

References Cited in the file of this patent

UNITED STATES PATENTS

| | | |
|---|---|---|
| 989,674 | Weiss | Apr. 18, 1911 |
| 1,234,769 | Kelly | July 31, 1917 |
| 2,266,339 | Shutz | Dec. 16, 1941 |
| 2,399,727 | Eklund | May 7, 1946 |
| 2,445,013 | Winkler | July 13, 1948 |
| 2,465,757 | Schlesinger | Mar. 29, 1949 |
| 2,753,617 | Felenchak | July 10, 1956 |